UNITED STATES PATENT OFFICE.

DANIEL BROBST, OF PORTLAND, MICHIGAN.

ROOFING COMPOUND.

SPECIFICATION forming part of Letters Patent No. 284,371, dated September 4, 1883.

Application filed May 21, 1883. (No specimens.)

*To all whom it may concern:*

Be it known that I, DANIEL BROBST, of Portland, in the county of Ionia and State of Michigan, have invented a new and useful Improvement in Roofing Compounds, of which the following is a full, clear, and exact description.

My compound consists of the following ingredients, combined in the proportions stated, viz: coal-tar, twelve gallons; broken asphalt, four gallons; gum-shellac, six pounds; glue, three pounds; salt, six pounds; alum, four pounds; gypsum, eight pounds; Roman cement, eight pounds; sulphur, five pounds; resin, five pounds; benzine, one-half gallon.

In preparing the compound the coal-tar is placed in an iron kettle and heated to the boiling-point, when the asphalt is added, and the heat is continued until the asphalt is fully melted. These ingredients form the body of the compound. The shellac and glue are then added to give elasticity to the roofing. The salt, alum, and gypsum are then added to make the roofing fire-proof; and the cement, sulphur, and resin are then added to cause the compound to dry quickly. The benzine is added to the compound before using it, to restore the volatile ingredients expelled from the coal-tar by boiling it.

In using the roofing compound I cover the roof with three layers of felt, and coat each layer with the compound applied with a brush. The outer layer is then covered with a heavy coating of the compound, and dry sharp sand is spread over the compound, and is pressed into it with an iron roller.

Having thus fully described my invention, I claim as new and desire to secure by Letters Patent—

The herein-described roofing compound, consisting of coal-tar, asphalt, gum-shellac, glue, salt, alum, gypsum, cement, sulphur, resin, and benzine, in the proportions specified.

DANIEL BROBST.

Witnesses:
L. W. HILL,
DANIEL DRAVENSTATT.